United States Patent
Kona et al.

(10) Patent No.: US 10,606,679 B2
(45) Date of Patent: Mar. 31, 2020

(54) DEBUG APPARATUS AND METHOD

(71) Applicant: Arm Limited, Cambridge (GB)

(72) Inventors: Anitha Kona, Austin, TX (US);
Michael John Williams, Ely (GB);
John Michael Horley, Hauxton (GB);
Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 193 days.

(21) Appl. No.: 15/830,380

(22) Filed: Dec. 4, 2017

(65) Prior Publication Data
US 2019/0171511 A1    Jun. 6, 2019

(51) Int. Cl.
| | | |
|---|---|---|
| G06F 11/00 | (2006.01) | |
| G06F 11/07 | (2006.01) | |
| G06F 13/42 | (2006.01) | |
| G06F 13/24 | (2006.01) | |

(52) U.S. Cl.
CPC ...... *G06F 11/0772* (2013.01); *G06F 11/0721* (2013.01); *G06F 11/0751* (2013.01); *G06F 13/24* (2013.01); *G06F 13/42* (2013.01); *G06F 13/4282* (2013.01); *G06F 2213/0026* (2013.01)

(58) Field of Classification Search
CPC ............ G06F 11/0721; G06F 11/0751; G06F 11/0772; G06F 13/4282
See application file for complete search history.

(56) References Cited

U.S. PATENT DOCUMENTS

| | | | | |
|---|---|---|---|---|
| 2004/0172219 A1* | 9/2004 | Curry, III | ............ | G06F 11/0751 702/186 |
| 2004/0172221 A1* | 9/2004 | Curry, III | ............ | G06F 11/0751 702/186 |
| 2005/0034017 A1* | 2/2005 | Airaud | ................ | G06F 11/2242 714/25 |
| 2007/0180322 A1* | 8/2007 | Todoroki | .............. | G06F 11/362 714/34 |
| 2010/0106876 A1* | 4/2010 | Nakahashi | .............. | G06F 13/26 710/261 |
| 2010/0174892 A1* | 7/2010 | Steeb | .................. | G06F 11/3632 712/227 |
| 2010/0192029 A1* | 7/2010 | Wang | .................. | G06F 11/2284 714/723 |
| 2012/0102303 A1* | 4/2012 | Jones | ...................... | G06F 15/16 712/244 |
| 2014/0281735 A1* | 9/2014 | Olivarez | .............. | G06F 11/2242 714/40 |
| 2015/0033082 A1* | 1/2015 | Shirlen | ............... | G06F 11/0724 714/40 |
| 2018/0107618 A1* | 4/2018 | Hosseinipour | .......... | G06F 13/24 |
| 2018/0210811 A1* | 7/2018 | Wang | ...................... | G06F 11/36 |
| 2018/0217915 A1* | 8/2018 | Wang | ...................... | G06F 11/36 |

* cited by examiner

*Primary Examiner* — Joshua P Lottich
(74) *Attorney, Agent, or Firm* — Nixon & Vanderhye P.C.

(57) ABSTRACT

An apparatus includes processor circuitry to perform data processing operations. Interface circuitry forms a connection to a plurality of other apparatuses and receives a foreign exception message indicative of a foreign exception event having been triggered on one of the other apparatuses. In response to receiving the foreign exception message, the interface circuitry forwards the foreign exception message to a set of the plurality of other apparatuses.

18 Claims, 7 Drawing Sheets

```
if (self.x == exceptionorigin.x && self.y == exceptionorigin.y) {
        if (top_neighbor_exists)
                send_message_to_top;
        if (bottom_neighbor_exists)
                send_message_to_bottom;
        if (left_neighbor_exists)
                send_message_to_left;
        if (right_neighbor_exists)
                send_message_to_right;
} else if (self.x == exceptionorigin.x) {
        send_message_to_top;
        send_message_to_bottom;
        if (self.y > exceptionorigin.y && right_neighbor_exists)
                send_message_to_right
        else if (self.y < exceptionorigin.y && left_neighbor_exists)
                send_message_to_left;
} else {
        if (self.x > exceptionorigin.x && top_neighbor_exists)
                send_message_to_top;
        else (self.x < exceptionorigin.x && bottom_neighbor_exists)
                send_message_to_bottom;
}
```

FIG. 4

DEBUG APPARATUS AND METHOD

The present disclosure relates to debugging.

When implementing software on an apparatus, it is common to debug the software during execution in order to identify and resolve any defects or issues. As data processing requirements of apparatuses increase, it has become more common to implement multiple processors together. Such systems typically perform complex data processing operations more efficiently than a single processor operating independently. When debugging such multiprocessor systems, it may be useful to trigger an exception in each processor of the system, for example, in order to halt other processors. It may be desirable to halt other processors so that data is not being manipulated by some processors while that data is potentially being analysed as part of the debugging process.

In some cases, a hardware mechanism for globally triggering an exception may be provided in the form of dedicated connections between each of the processors, which are adapted to exclusively transmit a signal that triggers an exception. For example, hardware pins of each processor may be connected to each other processor of the system. In this way, when an exception occurs at one of the processors, a signal can be propagated to all the other processors such that each of them also triggers a corresponding exception. Such a dedicated hardware mechanism for the global triggering of an exception incurs a significant resource usage, since a limited number of pins can be provided. In particular, the number of connections required increases with the square of the number of processors.

In some other cases, the debugger can be used in order to synchronise and/or control the processors. In this way, when an exception is to be handled by one of the processors while debugging is occurring, the debug software can be adapted to send a signal to the other processors in the system in order to cause those processors to halt. However, this process requires the sending of numerous signals to and from an external processing device on which the debugging operation is controlled to each processor (e.g. chip) in the system. Furthermore, since the decision to send the signal is made in software, which is being executed by the external processing device, this operation takes a number of processor cycles in order for the relevant halt signal to be sent out. In general, however, it is desirable for the processors to halt as quickly as possible so as to reduce problems that can be caused as a consequence of some processors being allowed to operate when data is being analysed.

At least one example described herein provides an apparatus comprising: processor circuitry to perform data processing operations; interface circuitry adapted to form a connection to a plurality of other apparatuses and to receive a foreign exception message indicative of a foreign exception event having been triggered on one of the other apparatuses, wherein in response to receiving the foreign exception message, the interface circuitry is adapted to forward the foreign exception message to a set of the plurality of other apparatuses.

At least one example provides a method for performing data processing on an apparatus comprising: forming a connection to a plurality of other apparatuses; receiving a foreign exception message indicative of a foreign exception event having been triggered on one of the other apparatuses; and in response to receiving the foreign exception message, forwarding the foreign exception message to a set of the plurality of other apparatuses.

At least another example provides an apparatus comprising: means for forming a connection to a plurality of other apparatuses; means for receiving a foreign exception message indicative of a foreign exception event having been triggered on one of the other apparatuses; and means for forwarding a foreign exception message to a set of the plurality of other apparatuses in response to receiving the foreign exception message.

The present invention will be described further, by way of example only, with reference to embodiments thereof as illustrated in the accompanying drawings, in which:

FIG. 1 schematically illustrates one example of an apparatus according to the present technique;

FIG. 4 illustrates an algorithm for forwarding exception messages throughout a system such as the system of FIG. 3;

Figure 1:
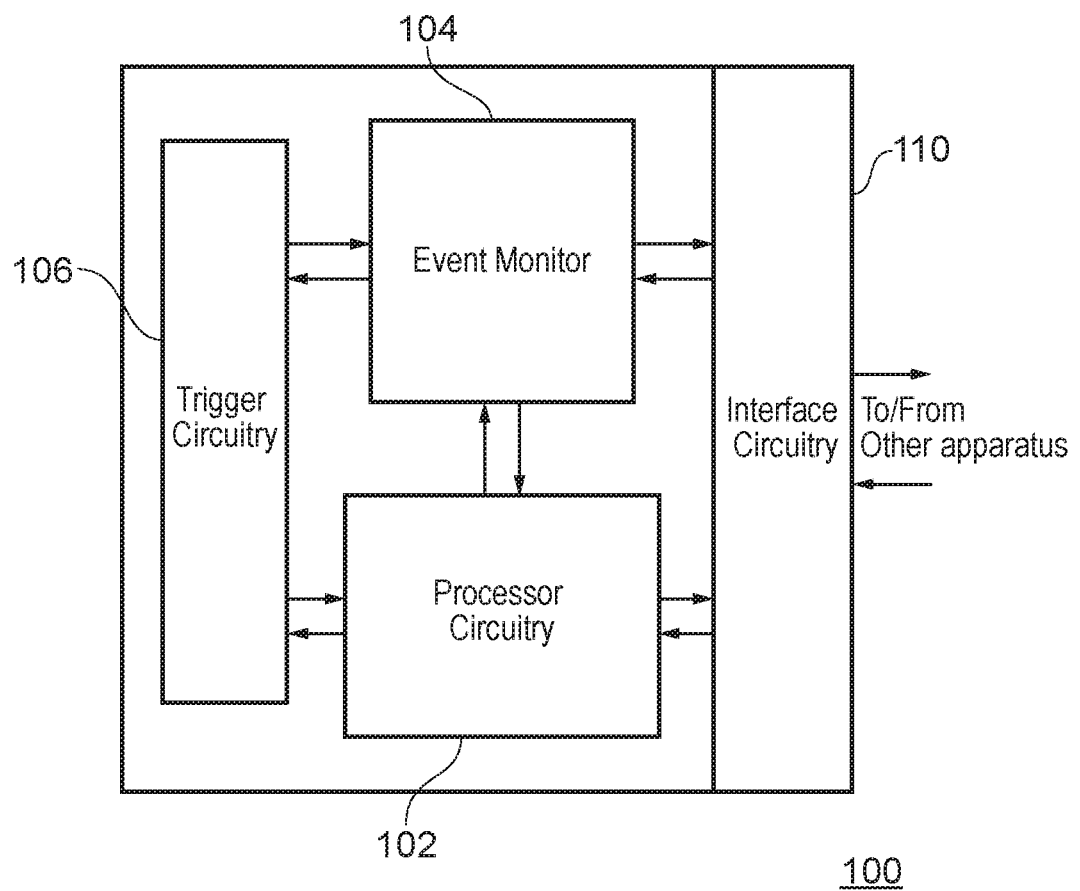

At least one example described herein provides processor circuitry to perform data processing operations; interface circuitry adapted to form a connection to a plurality of other apparatuses and to receive a foreign exception message indicative of a foreign exception event having been triggered on one of the other apparatuses, wherein in response to receiving the foreign exception message, the interface circuitry is adapted to forward the foreign exception message to a set of the plurality of other apparatuses.

The present technique recognises that forwarding an exception that has occurred on the other (foreign) apparatus, it is possible to propagate an exception throughout a network of apparatuses. In this way, an exception event can be propagated throughout a system having a plurality of apparatuses through a number of 'hops' so that a local apparatus can be made to take action in response to an exception that occurs on the other apparatus. For example, an exception that causes an other apparatus to halt can be made to cause other apparatuses to halt at the same time. The indication that an exception has occurred can be transmitted through an existing messaging protocol. As a consequence, there is no need for dedicated hardware pins to be used between each pair of apparatuses (chips) in order to enable the transmission of foreign exception messages. Furthermore, it is not necessary to use the debugger in order to propagate the exceptions from one apparatus to another apparatus. Note that the term 'connected' here does not require a direct physical connection, e.g. between every pair of apparatuses.

In some examples, the apparatus comprises trigger circuitry adapted, in response to receiving the foreign exception message, to trigger a local processor exception at the processor circuitry corresponding to the foreign exception event.

In some examples the apparatus comprises: event monitor circuitry to monitor the data processing operations for a local exception event, wherein the trigger circuitry is adapted, in response to the local exception event, to trigger the local processor exception and to generate a foreign exception message indicative of the local exception event;

and the interface circuitry is adapted to transmit the foreign exception message to the other apparatus. Accordingly, the apparatus not only locally replicates an exception that has been triggered at another apparatus, but also generates its own foreign exception messages when a local exception event occurs such that the event can be locally replicated at another apparatus.

In some embodiments, each candidate apparatus in the plurality of other apparatuses belongs to the set in dependence on one or more conditions, or the apparatus is adapted to ignore a foreign exception message in dependence on the one or more conditions. In such embodiments, it is therefore possible to control the extent to which and the circumstances under which an exception message from an other apparatus is propagated. This can be used to cause an exception event to only be forwarded to relevant other apparatuses.

In some examples, the foreign exception message comprises a source processor identifier; and the source identifier identifies the processor circuitry associated with a sender of the foreign exception message, or the source identifier identifies the processor circuitry associated with an origin of the foreign exception message. By providing such a source processor identifier, it is possible to identify the sender of the exception message or the ultimate origin of the exception message (e.g. the first apparatus in the system to transmit the corresponding exception message from which all others in the system were generated). This makes it possible to inhibit an exception message from being repeatedly forwarded around in circles or between a subset of apparatuses. By identifying either the immediate source of an exception message or the ultimate origin of the exception message, it is possible to take steps to identify when it is appropriate for the message to be ignored, thereby breaking any such cycle. Note that in some embodiments, where a single processor is provided per apparatus, the identifier of the processor circuitry could be an identifier of the apparatus. Also in some embodiments where there are multiple processors in each apparatus, each processor within an apparatus could have the same identifier, e.g. an identifier that is associated with the apparatus.

There are a number of different combinations of condition that could be applied in order to determine whether a candidate other apparatus belongs to the set of other apparatuses that receive a foreign exception message. However, in some embodiments, the one or more conditions comprises a condition comprising a comparison of at least part of the source processor identifier of the foreign exception message. For example, in some embodiments, the one or more conditions comprises a condition in which a part of the identifier of the processor circuitry associated with the candidate apparatus differs from the source processor identifier of the foreign exception message. In this way, a foreign exception message will not be forwarded to an apparatus from which the foreign exception message was received. This helps to avoid a situation in which an "infinite loop" is created as a consequence of two apparatuses continually forwarding the same exception message between themselves.

In some embodiments, the one or more conditions comprises a condition in which a part of the identifier of the processor circuitry associated with the candidate apparatus is greater than the source processor identifier of the foreign exception message. Consequently, a foreign exception message can be forwarded, but ultimately has a fixed "end point" at which point further forwarding of the foreign exception message is prevented. In these examples, once the foreign exception message reaches the apparatus having the highest identifier, further forwarding of the exception message is inhibited. Of course, it will be appreciated that in some alternative embodiments, the opposite is true. In particular, in some embodiments, the one or more conditions comprises a condition in which a part of the identifier of the processor circuitry associated with the candidate apparatus is less than the source processor identifier of the foreign exception message. In these embodiments, forwarding of the exception message is inhibited once the foreign exception message reaches the apparatus having the smallest identifier.

In some examples, the processor exception comprises one of: halting the data processing; and recording debug information indicative of a current data processing operation. In some embodiments, it is desirable to propagate such exceptions to other apparatuses so that debugging can be performed. In particular, if one apparatus is halted in order to allow debugging, the process of debugging can be made significantly harder if other apparatuses are permitted to keep operating. In particular, such apparatuses could modify data that is being analysed as part of the debugging process. Similarly, if an apparatus raises an exception to record debug information indicative of a current data processing operation, then it is desirable for other apparatuses to halt so as to limit the extent to which corruption can be caused as a consequence of an apparatus continuing to operate and process data while debug information is being recorded.

In some examples the interface circuitry is compatible with any combination of the following: PCIe, SATA, and GenZ.

The apparatus and the plurality of other apparatuses can be connected in a number of different ways. For example, in some embodiments, the apparatus is adapted to be organised in an array configuration together with the plurality of other apparatuses. Such an array could be viewed as a 2D grid of apparatuses. In such examples, the identifier associated with an apparatus could be a two-part identifier indicating an X field and a Y field. In other embodiments, the apparatus is adapted to be organsied in a linear configuration together with the plurality of other apparatuses. A linear configuration is one in which the logical topography of the apparatuses forms a line with no branches. Consequently, if there are n apparatuses and other apparatuses, then n−2 of these devices are directly connected to two other devices, and the remaining two devices are each directly connected to one other device. Propagating an exception message from a first apparatus at one end to the apparatus at the other end would require n−1 messages to be transmitted. In other embodiments, the apparatus is adapted to be organsied in a star configuration together with the plurality of other apparatuses. In such embodiments, a single apparatus is located in the middle and is directly connected to every other apparatus, which is in turn directly connected to the middle apparatus. In such configurations, an exception message can be propagated from any apparatus to any other apparatus in a maximum of two transmissions. In other embodiments, the apparatus is adapted to be organsied in a tree configuration together with the plurality of other apparatuses. Here, a tree need not be a binary tree, but could instead include any structure in which the logical topography includes branches.

In some examples, at least one of the plurality of other apparatuses is an external diagnostic apparatus. Where the apparatus is able to connect to a plurality of other apparatuses, none, one, or several of these other apparatuses may be external diagnostic apparatuses, while the remaining other apparatuses may be, e.g. chips in a multi-chip system on a PCB. In this way, a user can generate exceptions from the diagnostic apparatus to test the behavior of the system.

In some embodiments, the apparatus and at least some of the plurality of other apparatuses are on different chips.

Some particular embodiments will now be described with reference to the figures.

FIG. 1 shows one example of an apparatus (e.g. chip) 100 according to the present technique. The apparatus comprises processor circuitry 102, which is adapted to perform data processing operations in response to program instructions. In this example, the apparatus 100 further comprises an event monitor 104 and trigger circuitry 106. The event monitor 104 is adapted to monitor data processing of the processor circuitry 102 for a local exception event. In response to a local exception event being detected, the trigger circuitry 106 is adapted to trigger a local processor exception, which may halt data processing of the processor circuitry, for example. The apparatus 100 is also adapted with interface circuitry 110, which is adapted to couple the apparatus to at least one other processor element on another chip. The apparatus 100 may therefore be implemented in a multiprocessor, multichip system, comprising a plurality of apparatuses (e.g. chips) 100 being arranged on a PCB, and connected by communication channels of the PCB via their interface circuitry 110. As well as generating the local processor exception, the processor circuitry is adapted to generate a foreign exception message that is indicative of the local exception event. In other words, the foreign exception message gives an indication of what the local exception event is, such that the exception event can be recreated elsewhere if necessary. This foreign exception message is then transmitted via the interface circuitry. In this example, the interface circuitry 110 takes the form of chip-to-chip communication circuitry in which one apparatus can cause data to be written to, e.g. a memory of another apparatus in the system. This allows the passing of messages from one apparatus to another. Technologies such as PCIe, SATA, and/or GenZ can be used for this. Other suitable messaging technologies will be known to the skilled person.

Note that in some embodiments, either or both of the trigger circuitry and the event monitor could be removed. Such embodiments make it possible for a foreign exception message to be forwarded throughout a network of apparatuses so that, regardless of the distance (e.g. the number of 'hops') between an apparatus and a foreign apparatus that raised an exception, the apparatus is able to respond to the exception. This can be achieved without necessitating connections between every pair of apparatuses.

The interface circuitry 110 receives a foreign exception message from an other processing apparatus. Such a foreign exception message indicates an exception that has been triggered on the other processing apparatus. On receiving the foreign exception message, the processor circuitry triggers a local processor exception that corresponds with the foreign exception that was triggered on the other processing apparatus. This information is available from the foreign exception message. In this way, the foreign exception is locally replicated on the apparatus 100. When the exception indicates that the processing is to halt, or that debug information corresponding to a data processing operation is to be recorded, a similar operation can be performed on the apparatus 100.

Figure 2:
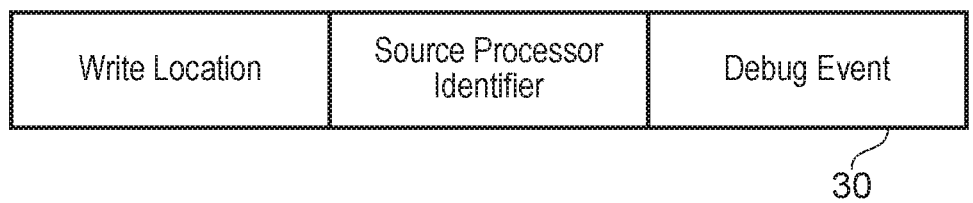
FIG. 2 shows an exception message that can be transmitted and received by the apparatus in order to allow local replication of exceptions.

FIG. 2 shows one example of an exception message 30 used to propagate exceptions across a plurality of apparatuses 100. As can be seen from FIG. 2, the exception message 30 comprises fields for a write location, a source processor identifier, and an exception event. As described above, when an exception event occurs locally at a given apparatuses 100, the event monitor 104 and the trigger circuitry 106 are arranged to trigger a local exception at the apparatus 100 where the event occurred. The processor circuitry 102 of the present technique is further adapted to generate an exception message 30, which indicates the exception event that occurred at the given apparatus. The write location field of the exception message is a location to which the exception message 30 is to be written. This will generally be a location on another apparatus 100, such as a memory or buffer. The source processor identifier indicates a source of the original exception event. This field can therefore be used to ensure that exception messages are not forwarded between apparatuses forever, but instead allow an apparatus to determine whether it should process the exception event. Note that in some other embodiments, the source processor identifier shows the source of the current exception message and further forwarding conditions help to prevent the exception message from being forwarded around in circles. Finally, the debug event field is used to indicate the exception event that occurred, i.e. the exception event that is to be locally replicated. This contains whatever further information is necessary for the exception event to be generated.

Figure 3:
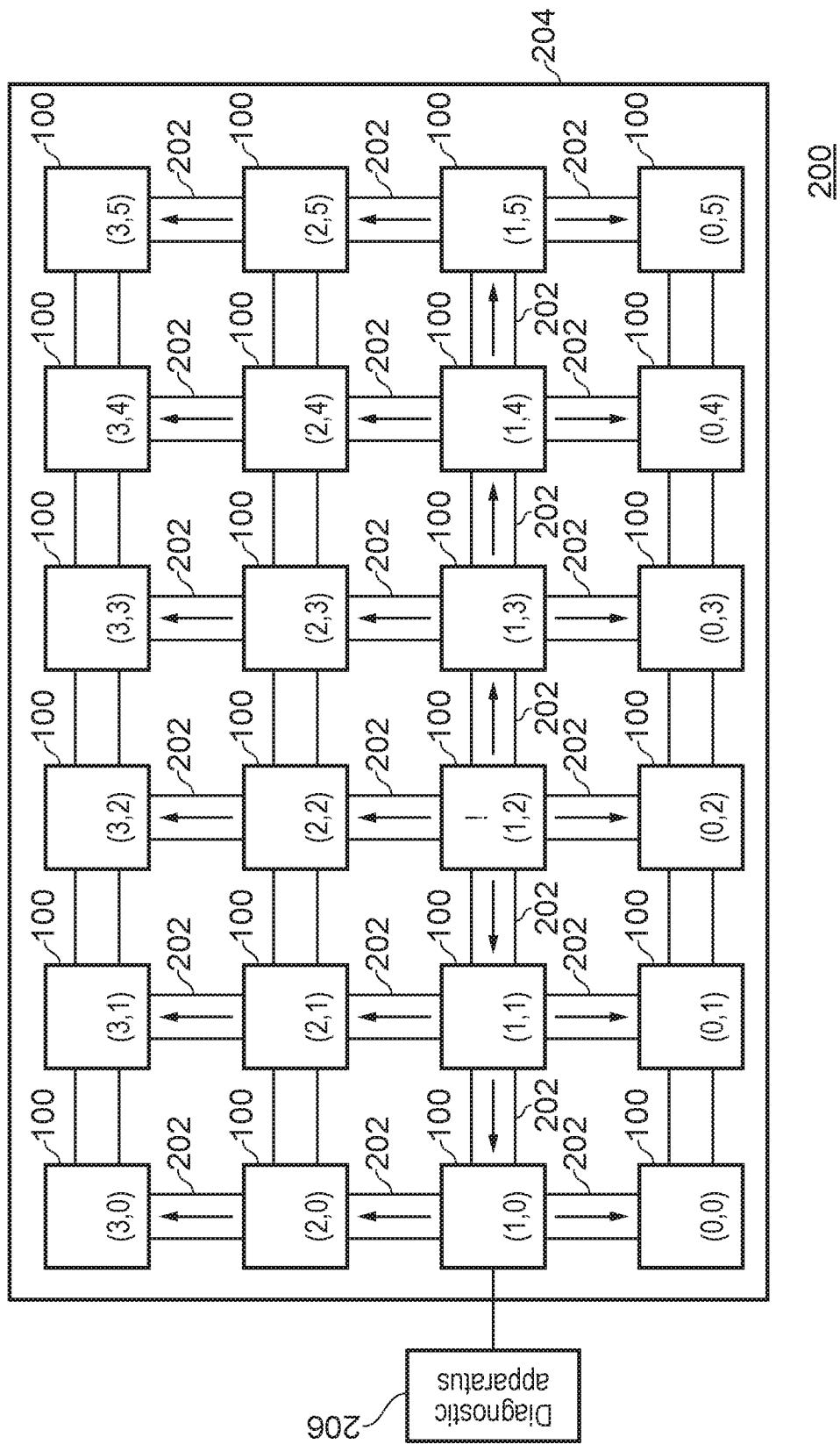
FIG. 3 shows one example of a system comprising a plurality of apparatuses according to the present technique.

FIG. 3 shows one example of a system 200, which comprises a plurality of the apparatuses (e.g. chips) 100 implemented on a PCB 204 in a matrix (e.g. a two-dimension array of chips). Each of the apparatuses (e.g. chips) 100 is connected to at least one other apparatus via an on-chip connection network comprising connections 202. The interface circuitry 202 of each apparatus 100 is arranged to engage with the connections 202 to couple each apparatus to the connection network of the PCB 204 with at least one other apparatus 100. In the embodiment of FIG. 2, each apparatus 100 is connected to each of its neighbors. In some embodiments, there may be some apparatuses that are not connected to all neighbours.

The processor circuitry 102 of each apparatus 100 has an ID, shown in brackets in FIG. 3. In this example, the ID comprises an X field and a Y field in the format (X, Y). The apparatuses 100 of FIG. 3 will be referred to by their respective processor IDs where appropriate in the following description. It will be appreciated that the example of FIG. 3 shows just one arrangement for the plurality of apparatuses 100, and that the apparatuses may be coupled to each other by a connection layout with a different structure.

In FIG. 3, apparatus (1, 2) experiences a local exception event. After triggering a local exception corresponding to the event, it conditionally transmits an exception message to each of the other apparatuses 100 to which it is connected, namely (1, 1), (2, 2), (1, 3), and (0, 2). Each of these receiving apparatuses then triggers their own local exception corresponding to the exception generated at (1, 2) and as indicated in the exception message. The process then repeats itself with each of the receiving apparatuses (1, 1), (2, 2), (1, 3), and (0, 2) conditionally retransmitting or forwarding the exception message to each other apparatus 100 to which it is connected. The arrows between apparatuses in FIG. 3 illustrate the sequence of exception message transmissions that take place when the conditional transmission at each apparatus corresponds with the algorithm discussed below with reference to FIG. 4. Additionally, one of the apparatuses in FIG. 3 is connected to a diagnostic apparatus 206. The diagnostic apparatus 206 enables a user to inject an exception event into the multi-chip network. In this manner, it is possible to test the system's reaction to a particular exception occurring.

Note that although the embodiment in FIG. 3 is directed to a multi-chip system, with each chip having a processor, it is possible for the present techniques to also be applied to a single-chip system comprising a plurality of processors.

FIG. 4 illustrates the conditions under which the exception message is forwarded at each apparatus. The variable 'exceptionorigin' refers to the ID of the apparatus from which the exception message is first generated. As discussed above, this identifier is made up from an X field and a Y field. The variable 'self' refers to the apparatus on which the algorithm is running, e.g. the apparatus that has received the exception message. In the algorithm, the apparatus firstly determines if it is the origin of the exception message. If so, the message is forwarded to each neighboring apparatus. Otherwise, if the apparatus has the same X field as the origin apparatus (e.g. if the two apparatuses are found in the same row) then the exception message is forwarded to the top and bottom neighbors (if they exist). In addition, if the Y field of the apparatus is greater than the Y field of the origin apparatus then the exception message is also forwarded to the right neighbor if it exists. Alternatively, if the Y field of the apparatus is less than the Y field of the origin apparatus then the exception message is also forwarded to the left neighbor if it exists. Otherwise (i.e. if the apparatus and origin apparatus do not share the same X field) then the exception message is forwarded to the top neighbor if it exists and if the X field of the apparatus is greater than the X field of the origin. Otherwise, the exception message is forwarded to the bottom neighbor if it exists and if the X field of the apparatus is less than the X field of the origin apparatus.

Consider the example of apparatus (1, 3) that receives the exception message, for example. The X field of the apparatus is 1 and of the exceptionorigin is 1. However, the Y field of the apparatus is 3 and of the exceptionorigin is 2. Therefore, the first 'if' statement fails, but the second 'if' statement passes. The exception message is therefore forwarded to the top and bottom neighbors of (1, 3), i.e. (2, 3) and (0, 3). In addition, since the Y field of (1, 3) (3) is greater than the Y field of the exceptionorigin (1, 2) (2), and since a right neighbor of (1, 3) exists, the message is forwarded to the right neighbor of (1, 3), i.e. (1, 4). The algorithm then begins again for the recipients of the exception message.

Therefore, in the example of FIG. 3 the forwarding of exception messages is targeted based on the source identifier of the exception message. In some other examples different algorithms may be implemented that rely on an anti-bounce mechanism of the source processor to prevent infinite propagation of the debug message. For example, should a receiving apparatus receive a debug message that includes a source processor identifier matching that of the receiving apparatus, then it can be deduced that the exception message has been propagated throughout the multicore system and bounced back to the apparatus, in which case the message is ignored. When a debug message is ignored it is not forwarded. Such an apparatus 100 increases the flexibility for designers of multi-chip systems, since the algorithm for propagating debug messages throughout the system can rely on this feature of the apparatus to terminate exception messages, alleviating the need for a more complex set of rules to be used.

It will be appreciated that there are a number of different ways that a plurality of apparatuses can be arranged.

Figure 5A:
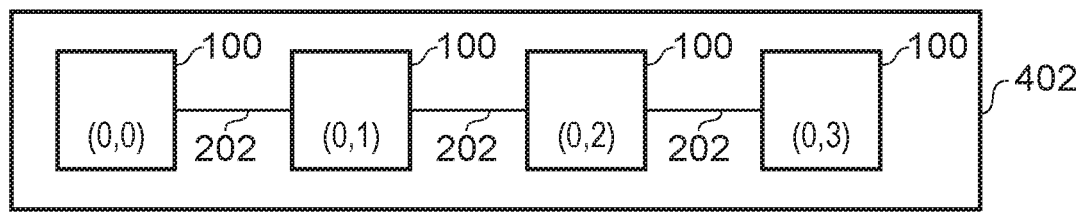
FIG. 5a shows another example of a system having a plurality of apparatuses in a linear arrangement.
Figure 5B:
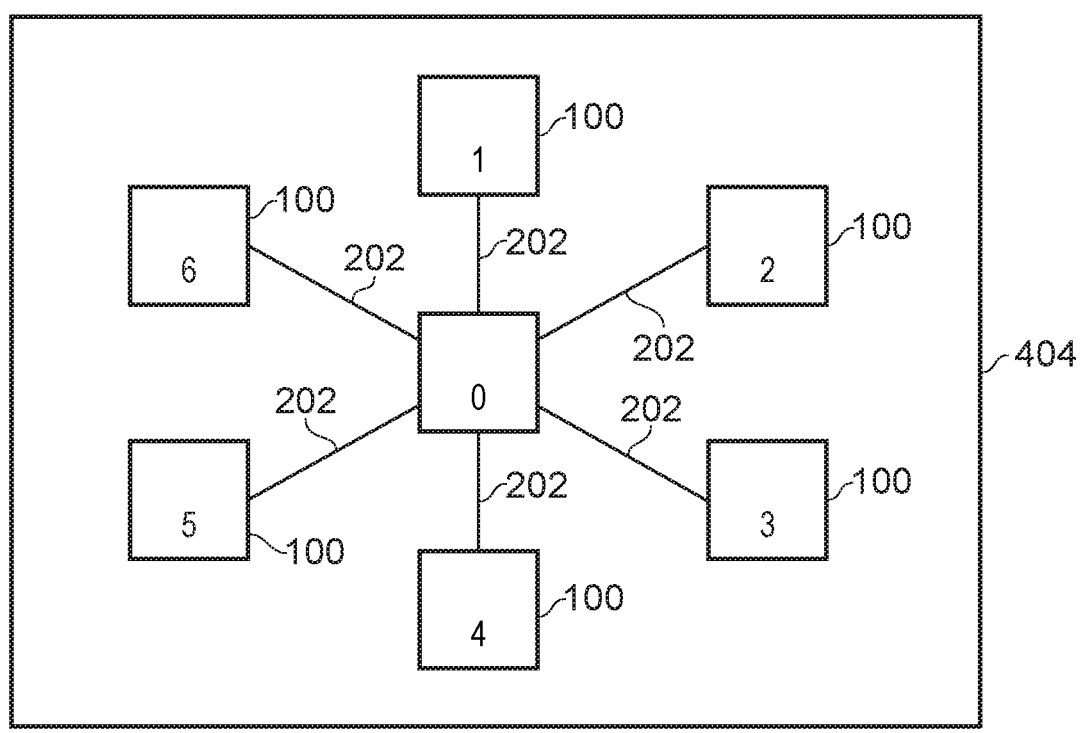
FIG. 5b shows yet another example of a system having a plurality of apparatuses in a star arrangement.

FIG. 5a shows another example of a multiprocessor system 400 implemented on a PCB 402. The chip 402 comprises four of the apparatuses 100 arranged in a linear configuration. FIG. 5b shows yet another example of a multiprocessor system 450 implemented on a PCB 404, with apparatuses 100 arranged in a star configuration.

Figure 6:
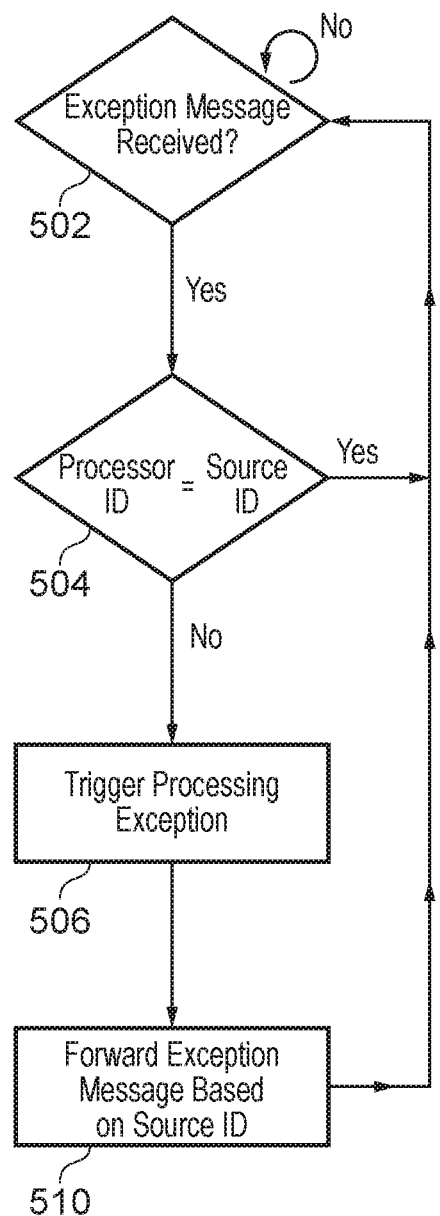
FIG. 6 shows a method for receiving exception messages in a multicore system.

FIG. 6 shows a method for receiving a debug message at a given processor in a multi-chip system. In step 502, it is determined whether a exception message is received. When an exception message is received, the source ID of the exception message is compared to the processor ID in step 504. A match indicates that the exception message originated from the given processor, and has already been propagated throughout the multicore system. Therefore, if this is the case, then the exception message is ignored and the method returns to step 502. On the other hand, if there is not a match this indicates that the exception message originated from another processor, and in response to this a processing exception is triggered in step 506. In step 508, forwarding of the exception message is controlled based on the source ID of the exception message.

Figure 7:
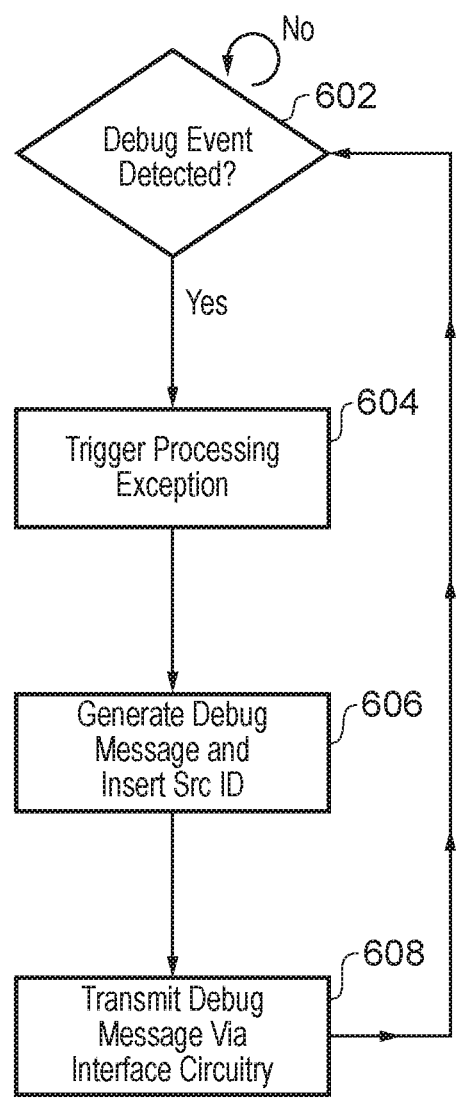
FIG. 7 shows a method for transmitting exception messages in a multicore system.

FIG. 7 shows a method for responding to an exception event at a given processor in a multicore system. In step 602, it is determined whether a exception event is detected. When an exception event occurs, a processing exception is triggered in step 604. Furthermore, in step 606 an exception message is generated, and the source ID of the processor is inserted in the exception message. In step 608 the exception message is transmitted to at least some neighboring processors of the system.

Hence, by the above techniques, it will be appreciated that an exception message can be propagated through a network of one or more other apparatuses. By locally replicating the exception message at each apparatus, each apparatus can be made to take some action in response to the original exception event that occurred. Where the exception event involves halting the apparatus, this can be made to cause all the apparatuses in the system to halt within a short space of time of the original apparatus being made to halt. By considering a source processor identifier, it is possible to inhibit apparatuses from forever forwarding the exception message amongst themselves. Furthermore, this entire process can be carried out without the need for debugging software to distribute the exceptions (e.g. at an external debug apparatus) and without the need for additional dedicated lines of communication to be provided, since existing chip-to-chip communication lines can be used.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
    processor circuitry to perform data processing operations;
    interface circuitry adapted to form a connection to a plurality of other apparatuses and to receive a foreign exception message indicative of a foreign exception event having been triggered on one of the other apparatuses, wherein in response to receiving the foreign exception message, the interface circuitry is adapted to forward the foreign exception message to a set of the plurality of other apparatuses, and wherein each candidate apparatus in the plurality of other apparatuses belongs to the set in dependence on one or more conditions, or the apparatus is adapted to ignore a foreign exception message in dependence on the one or more conditions.

2. The apparatus according to claim 1, comprising:
trigger circuitry adapted, in response to receiving the foreign exception message, to trigger a local processor exception at the processor circuitry corresponding to the foreign exception event.

3. The apparatus according to claim 1, comprising:
event monitor circuitry to monitor the data processing operations for a local exception event, wherein
the trigger circuitry is adapted, in response to the local exception event, to trigger the local processor exception and to generate a foreign exception message indicative of the local exception event; and
the interface circuitry is adapted to transmit the foreign exception message to the other apparatus.

4. The apparatus according to claim 1, wherein
the foreign exception message comprises a source processor identifier; and
the source identifier identifies the processor circuitry associated with a sender of the foreign exception message, or
the source identifier identifies the processor circuitry associated with an origin of the foreign exception message.

5. The apparatus according to claim 4, wherein
the one or more conditions comprises a condition comprising a comparison of at least part of the source processor identifier of the foreign exception message.

6. The apparatus according to claim 4, wherein
the one or more conditions comprises a condition in which a part of the identifier of the processor circuitry associated with the candidate apparatus differs from the source processor identifier of the foreign exception message.

7. The apparatus according to claim 4, wherein
the one or more conditions comprises a condition in which a part of the identifier of the processor circuitry associated with the candidate apparatus is greater than the source processor identifier of the foreign exception message.

8. The apparatus according to claim 4, wherein
the one or more conditions comprises a condition in which a part of the identifier of the processor circuitry associated with the candidate apparatus is less than the source processor identifier of the foreign exception message.

9. The apparatus according to claim 1, wherein
the processor exception comprises one of:
halting data processing; and
recording debug information corresponding to a current data processing operation.

10. The apparatus according to claim 1, wherein
the interface circuitry is compatible with any combination of the following: PCIe, SATA, and GenZ.

11. The apparatus according to claim 1, wherein
the apparatus is adapted to be organised in an array configuration together with the plurality of other apparatuses.

12. The apparatus according to claim 1, wherein
the apparatus is adapted to be organised in a linear configuration together with the plurality of other apparatuses.

13. The apparatus according to claim 1, wherein
the apparatus is adapted to be organised in a star configuration together with the plurality of other apparatuses.

14. The apparatus according to claim 1, wherein
the apparatus is adapted to be organised in a tree configuration together with the plurality of other apparatuses.

15. The apparatus according to claim 1, wherein
at least one of the plurality of other apparatuses is an external diagnostic apparatus.

16. The apparatus according to claim 1, wherein
the apparatus and at least some of the plurality of other apparatuses are on different chips.

17. A method for performing data processing on an apparatus comprising:
forming a connection to a plurality of other apparatuses;
receiving a foreign exception message indicative of a foreign exception event having been triggered on one of the other apparatuses; and
in response to receiving the foreign exception message, forwarding the foreign exception message to a set of the plurality of other apparatuses,
wherein
each candidate apparatus in the plurality of other apparatuses belongs to the set in dependence on one or more conditions, or
the apparatus ignores a foreign exception message in dependence on the one or more conditions.

18. An apparatus comprising:
means for forming a connection to a plurality of other apparatuses;
means for receiving a foreign exception message indicative of a foreign exception event having been triggered on one of the other apparatuses; and
means for forwarding a foreign exception message to a set of the plurality of other apparatuses in response to receiving the foreign exception message,
wherein
each candidate apparatus in the plurality of other apparatuses belongs to the set in dependence on one or more conditions, or
the apparatus is adapted to ignore a foreign exception message in dependence on the one or more conditions.

* * * * *